Dec. 2, 1924.
J. T. LARSON
1,517,648
WHEEL JACKING METHOD AND DEVICE
Filed April 14, 1924
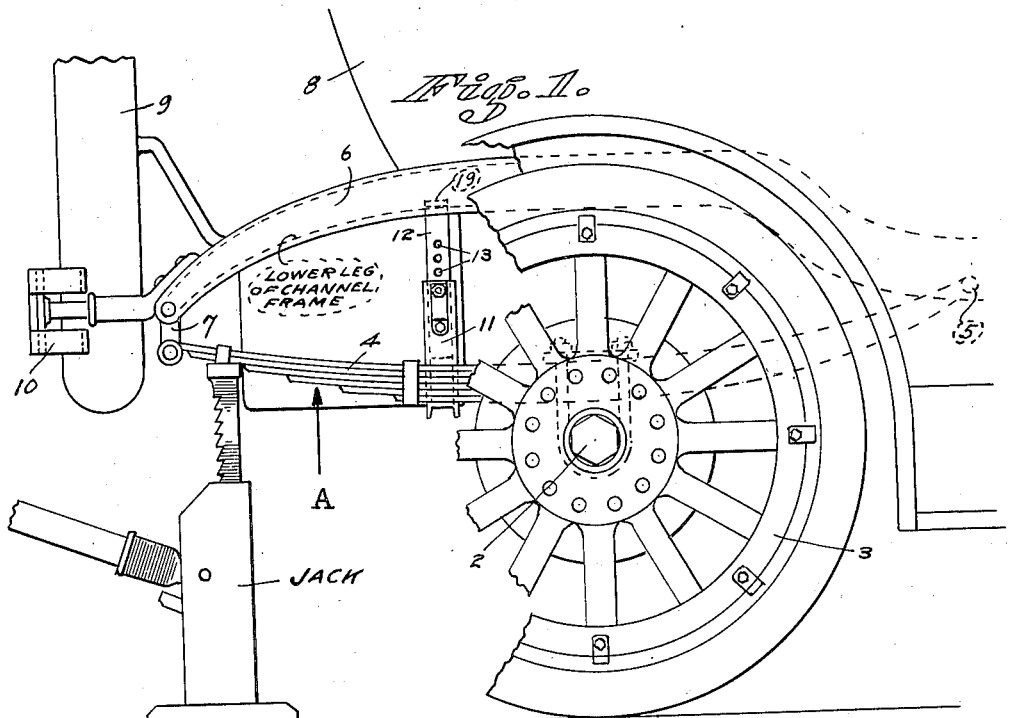
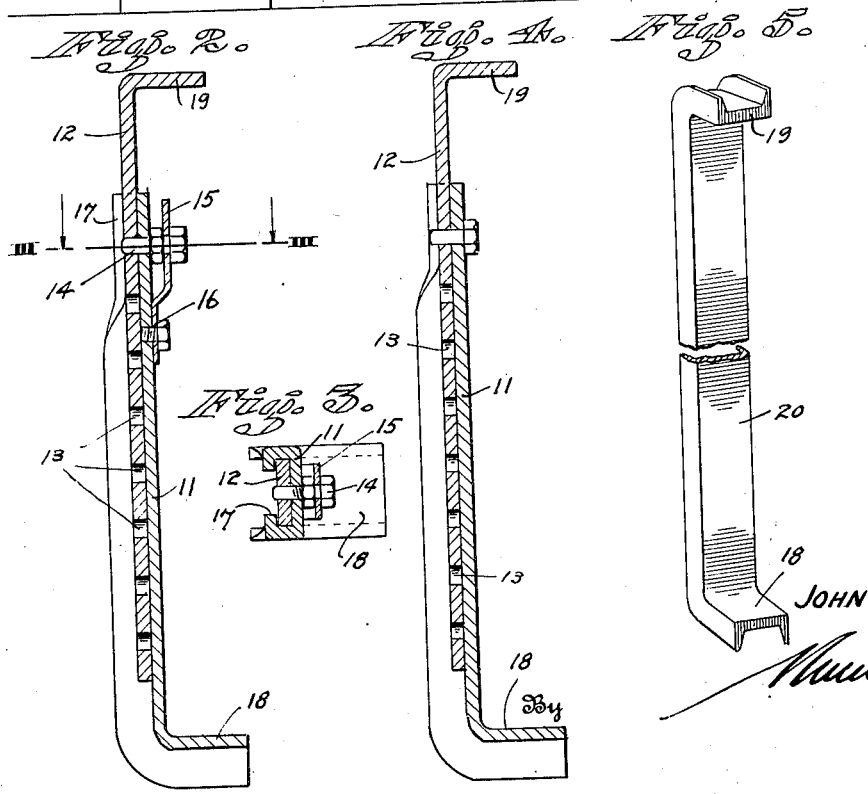
Inventor
JOHN T. LARSON
Attorneys Patented Dec. 2, 1924.

1,517,648

UNITED STATES PATENT OFFICE.

JOHN T. LARSON, OF BURLINGAME, CALIFORNIA.

WHEEL-JACKING METHOD AND DEVICE.

Application filed April 14, 1924. Serial No. 706,492.

*To all whom it may concern:*

Be it known that I, JOHN T. LARSON, a citizen of the United States, and a resident of Burlingame, county of San Mateo, State of California, have invented a new and useful Wheel-Jacking Method and Device, of which the following is a specification.

This invention relates to a method of jacking up the wheels of automobiles or other similarly spring suspended road vehicles and to suitable apparatus for carrying out the method.

In jacking up automobile wheels for the repair of tires or other reasons it is customary to place a jack under the axle or road spring close to the axle and force same upward by working the jack. This method is not easily carried out on many cars, especially at the rear wheels as the body, space tires, trunk rack, et cetera, usually extend so far rearward of the axle that it cannot be reached without crawling under the vehicle and ruining one's clothes.

The object of my invention is to overcome the difficulty mentioned by providing an improved method of jacking up such wheels, and simple apparatus to make the method effective.

In the drawings accompanying this application, Figure 1 shows the rear end of an automobile being jacked up by my improved method, and with a portion of the rear wheel broken away to show my apparatus for carrying out the method applied to the rear spring and frame of the vehicle.

Figure 2 is an enlarged longitudinal section of one form of my apparatus or device.

Figure 3 is a cross section of Figure 2 along the line 3—3 thereof.

Figure 4 is a longitudinal section of a modified construction of the device and Figure 5 is a perspective representation of a simple non-adjustable form of the device.

In Figure 1 the rear axle is behind the center (2) of the wheel (3) and is carried by the semi-elliptic spring (4) pivoted forwardly at (5) to the frame (6) of the vehicle and rearwardly linked at (7) thereto.

It will be seen from the position of the body (8), spare tires (9) and bumper (10) that the rear axle is quite inaccessible for jacking up the wheel. Also it has been found by experience that if the jack were placed under the spring at A in an attempt to jack up the wheel it would result simply in bulging the blades without lifting the wheel until perhaps the blades were injured. Also that if the jack were placed in the position shown in Figure 1, or on the link (7), the conditions mentioned would be even more aggravated and the wheel would simply sag with the spring and remain on the ground.

I have discovered, however, that if a hook or sling be extended from the frame (6) to the spring to prevent it from sagging that the wheel may easily be jacked up with a common jack applied to the spring at any point rearward of the hook or sling, and this with apparently no distortion or sag of the spring at all. This discovery makes it possible to place an easily applied hook or sling from the frame to the spring and conveniently jack the wheel up from an accessible position near the end of the spring as shown, thus overcoming all the difficulties of the earlier methods.

Therefore, since the frames of most automobiles are of channel section with the legs turned inward it is manifest that a simple hook can be devised to engage the lower leg and extend under the spring (7) also, that since the distance between the spring and channel vary in the different cars, a device to be useful for all cars should be adjustable in length. Such a device is shown in place in Figure 1 and in detail in Figures 2 and 3. It comprises preferably a channel hook member (11) slidably engaging a plain hook member (12), the plain member having a row of holes (13) in it engaged selectively by a bolt or pin (14) secured to a flat spring (15) in turn secured at (16) to the channel member, and the legs of the channel are bent over against the plain member at (17) to guide it for sliding adjustment.

The extreme ends of both members (18) and (19) form the hooks to engage respectively the channel and the under side of the spring.

In Figure 4 is shown a similarly constructed adjustable hook but omitting the spring on the adjusting bolt.

For the very cheapest form of construction, to be used for a given car only, a plain bar or channel (20) may be bent over at both ends as shown in Figure 5.

Of course it is evident that a chain loop may be used or a hook permanently pivoted to the frame for swinging down into position, or that the hook may pass through a hole in the channel or over the top, or engage an auxiliary link placed around the spring, and that many other ways of accomplishing the result probably exist, also that my method is applicable to the front wheels as well as to the rear wheels.

Therefore, it is intended that any such modifications as may fall within the spirit of the invention are to be covered in my appended claims.

I claim:

1. The method of jacking up the wheel of a vehicle wherein the axle of the wheel is carried by a leaf spring hung from a connection to the frame of the vehicle, which consists in engaging the spring and frame in a device to prevent spreading apart of the spring relative to the frame, and of jacking up the spring at a point between said device and the frame connection.

2. A wheel jacking auxiliary for a leaf spring supported vehicle wheel and axle which comprises a bar with a hook at each end adapted to the purpose specified, said bar being in two parts slidably adjustable for changing the distance between the hook ends.

JOHN T. LARSON.